Sept. 24, 1935.  B. ZEISS  2,015,542
MEANS FOR TEMPORARILY CLOSING THE CHANNELS IN
HOLLOW CONDUCTORS OF FLUID FILLED CABLES
Filed March 16, 1932
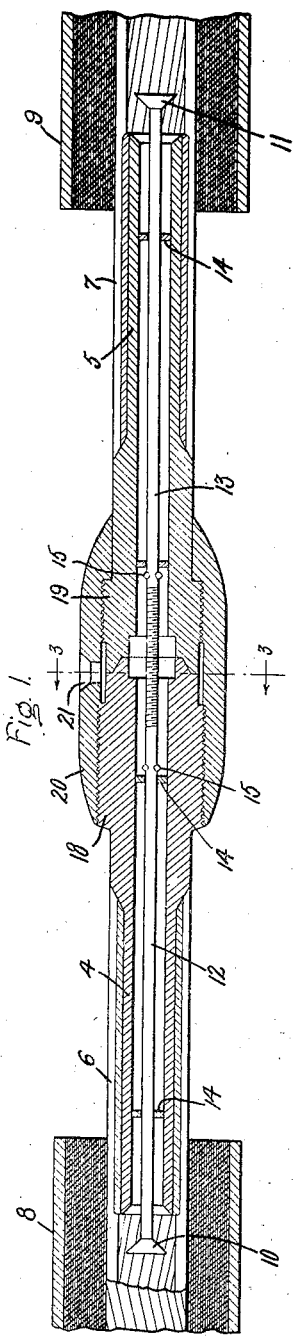
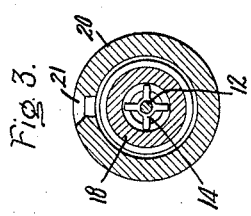
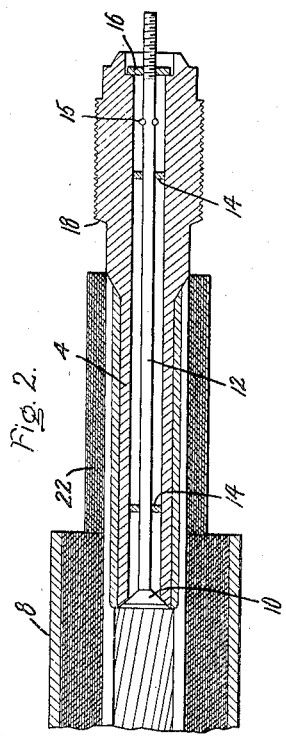
Inventor:
Bruno Zeiss,
by Charles E. Mueller
His Attorney.

Patented Sept. 24, 1935

2,015,542

UNITED STATES PATENT OFFICE 2,015,542

MEANS FOR TEMPORARILY CLOSING THE CHANNELS IN HOLLOW CONDUCTORS OF FLUID FILLED CABLES

Bruno Zeiss, Copenick-Wendenschloss, Germany, assignor to General Electric Company, a corporation of New York Application March 16, 1932, Serial No. 599,271
In Germany March 18, 1931

4 Claims. (Cl. 173—268)

The invention relates to means for temporarily closing the channels in hollow conductors of fluid filled cables to make possible the rapid establishment of the connection or joint between cable lengths. My invention comprises the provision of improved connecting members having valves therein, which serve to connect the hollow conductors, said valves being closed during transport or installation of the cable and automatically opened by the act of moving the cable ends into position for jointing.

It is appropriate to arrange the valves in the members at the ends of the connecting tubes located inside the hollow conductor, so that they are held closed by the pressure of the fluid, such as oil, within the cable. The automatic opening of the valves with the making of the cable connection is effected by providing the valves with guide rods which are of such a length that, when the valves are closed, the rods project beyond the outer ends of the connecting tubes. On making the connection between cable ends, the rods abut and thereby open the valves, so that the hollow spaces or channels of the adjacent conductors are then connected together. In order to protect the valves against unintentional opening during transit and installation, screw-nuts are arranged on the outer ends of the guide rods and are tightened so as to firmly seat the valves. Cross-shaped or similarly formed guides or distance pieces provided with openings are located in the connecting tubes, by means of which the guide rods are held concentric with the tubes.

For a consideration of what I believe to be novel and my invention, attention is directed to the accompanying description and the claims appended thereto.

A constructional example of my invention is represented in the drawing in which Fig. 1 shows the opened position of the valves after the joining of two cable sections; Fig. 2 shows the closed position of the valve during transit; and Fig. 3 shows a section of the parts on the line 3—3 of Fig. 1.

The connecting members comprise enlarged heads and tubes 4 and 5, the latter being inserted for a part of their length into the ends of the hollow conductors 6 and 7 of the two cable lengths 8 and 9 and are soldered to the wires of the conductors. The end face of one of the heads is formed as a cone and the end face of the other has a corresponding conical recess. Such an arrangement assures a tight fit between the heads when they are forced together. At the inner ends of the tubes 4 and 5 which are within the conductors are valves 10 and 11 carried by guide rods 12 and 13. The arrangement of the valves is such that they are held closed by the fluid pressure in the channel of the hollow conductors. The guide rods are held in a position concentric to the connecting tubes by means of spaced distance pieces 14. These distance pieces also have openings; for example, they are constructed in the form of a cross as shown in Fig. 3 so as not to obstruct the flow of fluid after the connection has been made. Closing discs 16 screwed on to the ends of the guide rods 12 and 13 protect the valves against unintentional opening during transit and installation. The valve rods are provided with lugs 15 which prevent the valves from accidentally slipping into the cable during assembly of the parts. Also they serve as means to ensure the opening of both valves in case the fluid pressure in one cable length is higher than in the other, or in the event of one valve opening less readily than the other. This is due to the fact that the lugs on one rod or the other engage a distant piece or guide and form a stop whereupon further movement of the heads toward each other causes the second valve to open.

Screw-threads are turned on the enlarged end heads 18 and 19 of the members and serve to receive the screw threaded sleeve or nut 20 by means of which a strong connection is established between them. An opening 21 is made in the sleeve 20 through which solder is introduced in order to obtain a satisfactory connection. To prevent fluid leaking from the cable ends during transit and during the process of joining the cable ends, that is to say, before the fitting of the sleeve is finished, the projecting cable ends 8 and 9 are wound with insulating band 22, Fig. 2. The band may or may not form a part of the permanent insulation applied after the conductors are joined. In making the connection the procedure is as follows: The cables with the valves closed and secured by means of the closing discs or nuts 16 are brought into the fitting position. The clamping sleeve 20 is turned back so far that the enlarged head of the connecting member and tube 5 projects beyond it. The closing discs 16 are then removed and the two members joined so that their axes coincide. Before the tube ends or heads engage one another the ends of the guide rods 12 and 13 contact whereby the valves 10 and 11 are opened, it being noted that the lengths of the two rods are greater than the distance between the valve seats. Since the distance pieces have openings, the hollow spaces or channels of the cable conductors are now in communication and fluid can flow from one cable section to the other. The clamping sleeve 20 on the member having tube 5 is then turned forwardly until it engages the threaded end of the other connecting tube 4 to the length required. The diameter of the screw threads on the head 19 is less than that of the threads on the head 18 and the axial length of the threads of the latter is substantially twice that of the former. In assembling, the heads are brought into face contact and the nut 20 moved to the left until its threads engage those on the head 18. The nut is then turned until it covers about one-half of the threads on the head 18 whereupon the threads on the head 19 and nut also engage. This turning movement of the nut is continued until the internal shoulder thereof engages the external shoulder on the head 19. Liquid solder is now introduced through the opening 21 and in this manner a firm electric and mechanical connection is established, and at the same time, the hollow space or channel in the tubes is sealed. Finally, the joint is insulated in the usual way and the sleeve casing fitted to the cable sheaths in a fluid tight manner. The casing may be evacuated and filled with insulating fluid in any customary manner.

What I claim as new and desire to secure by Letters Patent of the United States, is:—

1. A cable joint comprising lengths of insulated stranded conductors, each having a central channel filled with fluid insulation, a connector for the conductors comprising a pair of cooperating tubular members, each having a head and a tube of less diameter than the head projecting into the channel for supporting the strands of the conductor, the head and tube being integral, a valve seat at the inner enclosed end of each tube, valves adapted to be held on their respective seats by the fluid contained in the channels, rods located within the tubes and heads having a combined length greater than the distance between the seats so that when the heads are brought into engagement, the rods automatically open the valves, and a means carried by one of the heads and engaging the other for positively uniting them.

2. A cable joint comprising lengths of insulated stranded conductors, each having a central channel filled with fluid insulation, a connector for the conductors comprising a pair of cooperating tubular members, each having a head and a tube of less diameter than the head, said tube projecting into the channel for supporting the strands of the conductor, the head and tube being integral, a valve seat at the inner enclosed end of each tube, valves adapted to be held on their respective seats by the fluid contained in the channels, rods located within the tubes and heads having a combined length greater than the distance between the seats so that when the heads are brought into engagement, the rods automatically open the valves, and a screw threaded nut carried by one of the members and engaging the other for permanently holding the end faces of the heads in firm contact relation.

3. A cable joint comprising lengths of insulated stranded conductors, each having a channel filled with fluid insulation, a connector for the conductors comprising a pair of cooperating members, each having a head and a tube of less diameter than the head for supporting a conductor, a valve seat at the inner end of each tube, valves adapted to be held on their respective seats by the fluid contained in the channels, rods located within the tubes having a combined length greater than the distance between the seats so that when the heads are brought into engagement, the rods automatically open the valves, stops within the tubes acting on the rods to limit the longitudinal movement of one with respect to the other, to prevent opening of one valve and not the other, and a means carried by the heads for positively uniting them.

4. A cable comprising a length of insulated cable having a channel which is filled with insulating fluid during transport and installation, a member permanently attached to one end of the cable comprising a tube which extends into the channel and to which the strands of the conductor are permanently secured and supported thereby, a seat on the inner enclosed end of the tube, a valve held on the seat by the pressure of the fluid in the channel, a head of larger diameter than the tube and integral therewith, a rod extending lengthwise of the tube and head, the inner end of which opens the valve, and a means accessible from the outside of the head for forcibly seating the valve to prevent it from being accidentally opened.

BRUNO ZEISS.